May 10, 1966  B. W. O. DICKINSON III  3,250,120

METHOD AND APPARATUS FOR DETERMINING FLAW LOCATIONS

Filed Oct. 8, 1962  2 Sheets-Sheet 1

INVENTOR.
BEN WADE OAKES DICKINSON III
BY
Flehr and Swain
ATTORNEYS

United States Patent Office 3,250,120
Patented May 10, 1966

---

3,250,120
METHOD AND APPARATUS FOR DETERMINING FLAW LOCATIONS
Ben Wade Oakes Dickinson III, 3290 Jackson St., San Francisco, Calif.
Filed Oct. 8, 1962, Ser. No. 228,894
15 Claims. (Cl. 73—67.6)

This invention relates to a method and apparatus for determining flaw locations, and more particularly to such a method and apparatus which causes perturbations in the deflected ultrasonic wave train by non-destructively introduced temporary anomalies (thermal and liquid stream) to affect the phase, spacing and amplitude of the deflected wave train or trains at the flaw location. It also relates to a method for continuously monitoring tubular objects for overheating or local hotspots, and for continuously monitoring lined tubular objects to determine lining failures.

In copending application Serial No. 151,331, filed November 9, 1961, entitled "Method and Apparatus for Generating and Receiving Ultrasonic Helical Wares," now Patent No. 3,186,216, there is described various methods and apparatuses for detecting flaws and determining their locations. However, the methods and apparatuses therein disclosed are specially adapted to tubular members such as line pipe, cylindrical casings and the like. There is, therefore, a need for a method and apparatus which can be utilized for determining flaw locations in flat plates as well as tubular objects.

In general, it is an object of the present invention to provide a method and apparatus for determining flaw locations in members of all shapes and sizes.

Another object of the invention is to provide a method and apparatus of the above character which is particularly adapted for use with flat plates.

Another object of the invention is to provide a method and apparatus of the above character which is relatively inexpensive and can be readily accomplished under relatively adverse conditions in the field.

Another object of the invention is to provide a method and apparatus of the above character which is relatively simple.

Additional objects and features of the invention will appear from the following description in which the preferred embodiments are set forth in detail in conjunction with the accompanying drawings.

Figure 1:
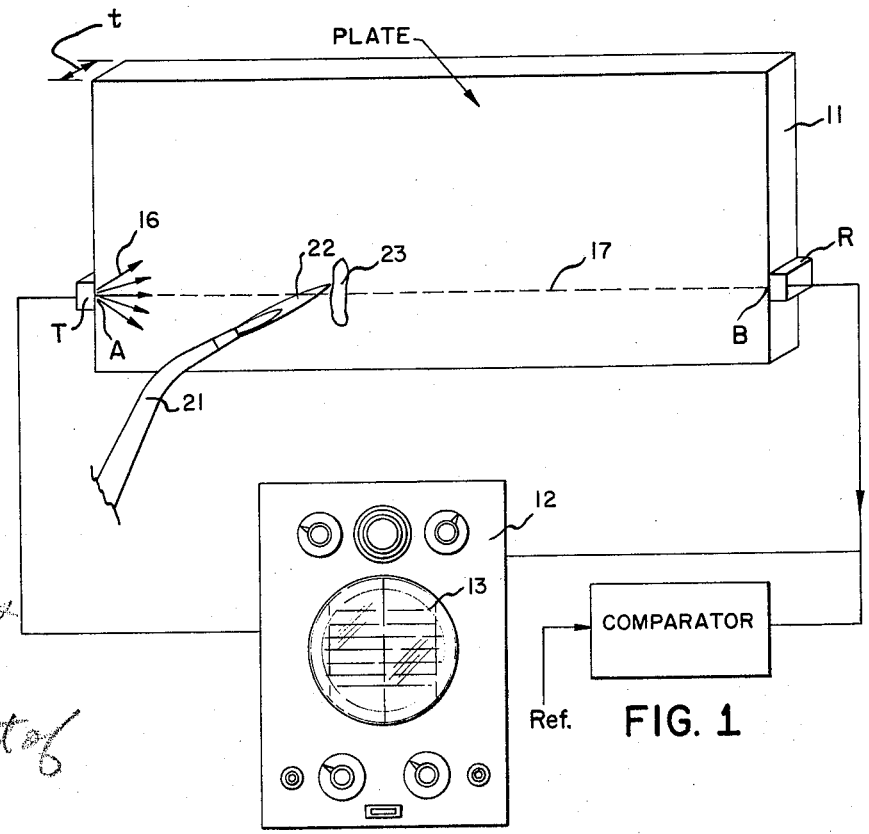
Figure 2:
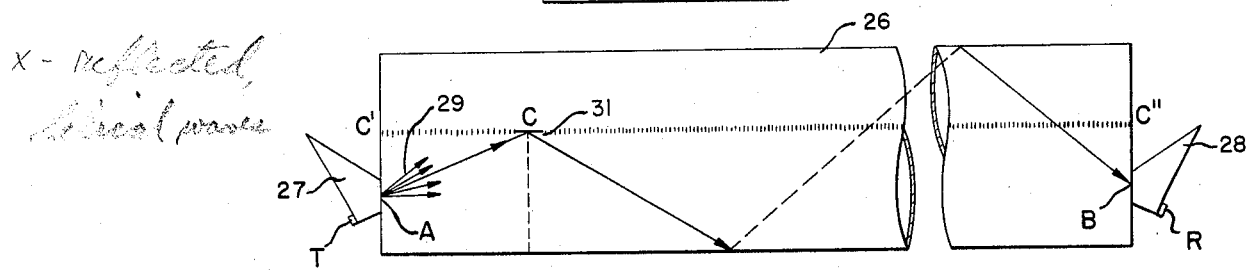
Figures 1A, 3:
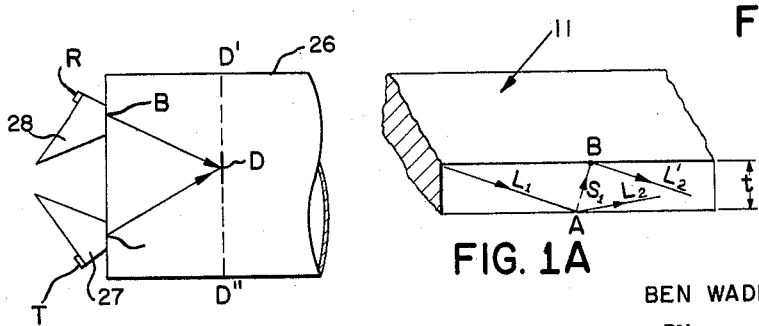
Figure 5:
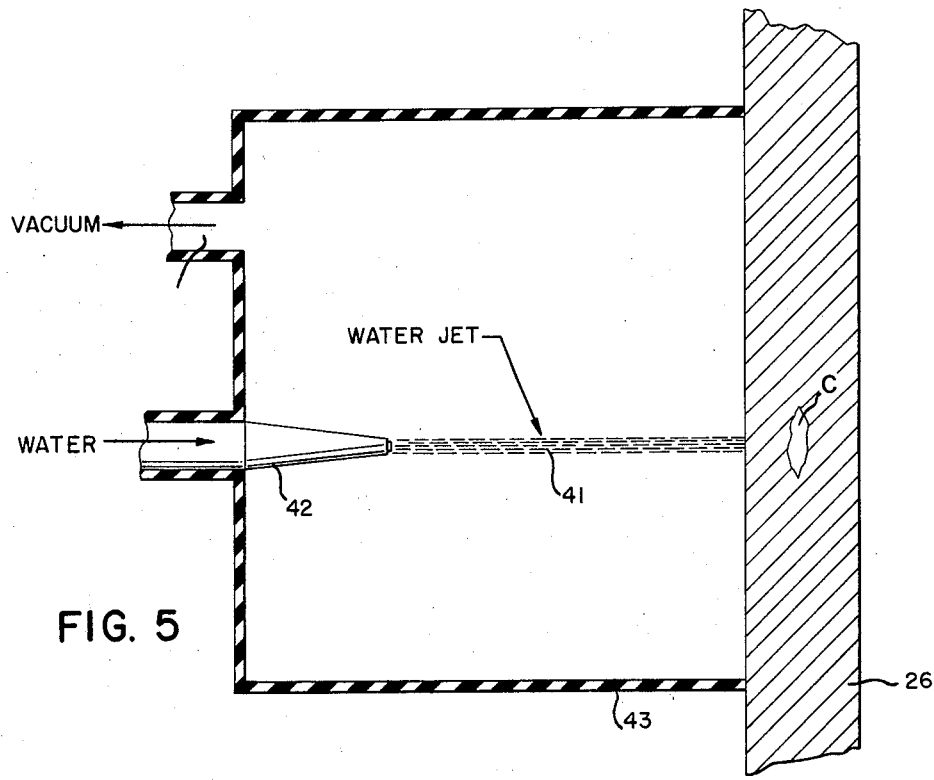
Figure 4:
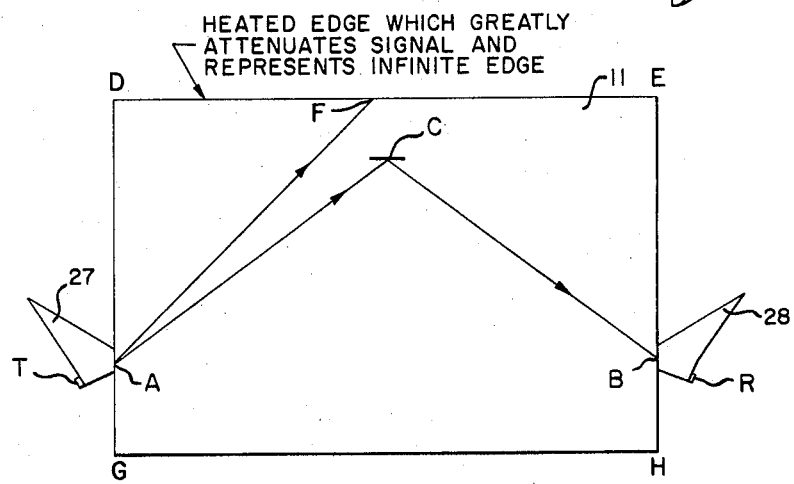

Referring to the drawings:
FIGURE 1 is a diagrammatic illustration of apparatus illustrating the principle utilized in my invention;
FIGURE 1A is a schematic illustration showing mode conversions which result in trailing pulses;
FIGURE 2 is a front elevational view of a portion of the apparatus utilized for determining the location of axial flaws in a tubular member in accordance with my method;
FIGURE 3 is a front elevational view of a portion of the apparatus utilized for determining the location of flaws perpendicular to the longitudinal axis of a tubular member in accordance with my method;
FIGURE 4 is a partial plan view of a portion of the apparatus utilized for determining the location of flaws in a flat plate in accordance with my method;
FIGURE 5 is a partial cross-sectional view of apparatus for determining the location of flaws utilizing means for carrying away ultrasonic energy from a localized area.

In FIGURE 1, there is shown a flat plate of metal 11 which is being used to illustrate the principle used in the method. A transmit transducer T is secured to one end of the plate 11 in a suitable manner and a receive transducer R is secured to the other end of the plate as indicated in the drawings. The transducers can be of any suitable type such as, but not limited to, lead metaniobate manufactured by General Electric Co., or the type "Z" transducer manufactured by Branson Instruments, Inc., of Stamford, Conn. The transmit transducer T is energized by pulses of waves from a suitable transmitting, receiving and display apparatus 12 of a conventional type such as Model 5 Ultrasonic Sonoray manufactured by Branson Instruments, Inc. As is well known to those skilled in the art, such apparatus can produce pulses of ultrasonic waves and can receive the same and display them on an integral oscilloscope 13.

Operation of the apparatus 12 will cause ultrasonic wave trains to be produced by the transducer T and introduced into the end of the plate 11 at point A in a direction of propagation away from the transducer T. These ultrasonic wave trains are indicated by a plurality of rays 16. These rays, as shown, are substantially uncollimated and are angularly diverging so that they spread through the entire plate. Certain of the ultrasonic wave trains, as indicated by the ray 17, will emerge from the plate 11 at point B and be received by the receive transducer R.

When the ultrasonic wave trains are introduced into the plate 11, assuming that the plate has a width and a length which is relatively great and compared to the thickness of the plate, complex sonic waves are generated within the plate. These complex waves are not pure longitudinal sound waves but rather are made up of longitudinal and shear wave components because of interaction of the ultrasonic waves with the boundaries of the plate. In general, the net phase or group velocity of the sound wave trains travelling through the material is less than that of longitudinal waves. In some circumstances, these complex sonic waves may be termed "Lamb" waves. In other circumstances, a combination of complex waves combining Lamb waves, longitudinal and shear waves may be present. For the circumstances where Lamb waves alone are involved and a plate is subjected to ultrasonic wave energy, interior particles are displaced in directions both parallel with and normal to the plate surfaces according to the particular mode of vibration. The number and types of modes possible within a plate depend upon the thickness of the plate, the material of which the plate is formed and the frequency of the ultrasonic wave energy. Each mode travels in the plate with a phase and group velocity related to the product of the frequency and the plate thickness and varies between Rayleigh wave velocity and infinity.

It also should be pointed out that many types of transducers T do not put out a wave train at a pure frequency but rather put out wave trains in a band of frequencies. Specific frequencies within this band will interact with a plate of a predetermined thickness to form the various modes hereinbefore described, each at a slightly different phase or group velocity, and each phase or group velocity having a characteristic attenuation. When the sonic waves travel for a long distance within the plate, the plate acts as a mechanical filter because only those modes with low attenuation will be transmitted from point A to point B in the plate. Thus, variations in plate thickness will primarily affect those modes of the sound waves which are transmitted long distance.

For the case where complex longitudinal, shear and/or Lamb waves may be present, the final effect is the same. A simplified ray presentation which is only schematic of how some of the complex wave components interact with the boundaries of the plate or waveguide (11), is shown in FIGURE 1A. Herein, a longitudinal wave train is propagating at a very slight grazing angle with respect to the side of a plate. $L_1$ is a grazing longitudinal wave, $S_1$ is a resultant mode converted shear wave, $L_2$ is a longitudinal wave reflected from $L_1$ and $L'_2$ is a longitudinal wave resulting from reflection-mode conversion from $S_1$. $L'_2$ lags $L_2$ in time by the time of flight of $S_1$ from A to B across thickness $t$ of the plate. This reflecting, mode converting phenomenon results in a series of pulses trailing an initial pulse, which are a function of thickness $t$, the density and elastic properties of the plate or waveguide 11.

I have found that by applying means which is capable of changing the ultrasonic characteristics of the plate in a localized area, that the attenuation phase and spacing of the sonic wave trains in the plate 11 are changed, thereby introducing perturbations into the ultrasonic wave trains. Thus, for example, in FIGURE 1, I have shown means for selectively spot heating the plate 11 consisting of an oxyacetylene torch 21 which has a very hot flame 22 which can be applied to the plate to heat a selected spot 23 in the plate which is in the path of the ultrasonic wave trains 17. Heating of the material forming the member 11 in the localized area of the spot 23 will affect the local thickness, density and elastic properties of the material causing interference effects. The changes in density and elastic properties affect the attenuation of any sound waves travelling through the heated area. The change in thickness of plate 11, in the case of Lamb wave transmission, affects the phase and group velocity of each mode of the transmitted sound slightly because the Lamb wave sonic phase and group velocity in a particular media is a function of the product of frequency and plate thickness as hereinbefore described.

In simplified and schematic ray diagram terms, the change in thickness of plate 11, as shown in FIGURE 1A, in the case of complex waves, which may include Lamb waves, causes a variation in the time of flight of the reflected-mode converted longitudinal wave $L'_2$. The result is a relative phase and delay variation of $L'_2$ with respect to $L_2$ as a result of local heating to thereby create trailing or delayed sonic pulses.

Because of these interference effects, the pattern on the oscilloscope 13 is one of shifting pulses and varying amplitude. This creates a bubbling of the pulses which is caused by a combination of varying sonic interference and attenuation with varying local density and elastic properties and variations in local plate and waveguide thickness and results in increases and decreases of the signal levels, phase and delay relationship of the wave trains recieved by the transducer R. It is believed that the pronounced interference, attenuation, and/or bubbling effects produced by localized heating of the flaw arises from the following causes:

(i) A change in the thickness (e.g. by heating) of the acoustic wave guide through which the wave train is passing which in turn changes its characteristics as an acoustic filter. In turn the optimum (least attenuation) frequency and associated mode of the complex acoustic radiation which will be passed by the wave guide changes. If the transmit transducer is operating such as to put out a band of frequencies, which every real transducer with a noninfinite Q does, then a shift occurs in the preferentially passed frequency and mode of the complex acoustic wave train. But this new combination of frequencies and modes has slightly different acoustic phase/group velocities which in turn introduces phase shifts and resultant constructive-destructive interference which in turn causes the bubbling effects seen.

(ii) Other contributions to the bubbling effects arise from the nature of the interaction with the flaw. In this, the flaw acts as a poor, but useful, acoustic diffraction grating. Thus the broad band radiation incident on the flaw scatters after deflection as a function of frequency. Also, local heating at the flaw changes the acoustic index of refraction in the neighborhood of the flaw and also physically distorts the flaw itself as well as changes the diffraction grating effect. These changes are enhanced because of the rapid change in temperature.

It is believed that heating of the acoustic ray path does not produce such strong bubbling effects for the following reasons:

(i) When an area is heated, the elastic parameters of the material comprising the acoustic wave guide change. The acoustic velocity ($c$) is proportional to the elastic parameters. With a change in temperature, there occurs both a change in the elastic parameters and density such that the acoustic velocity changes. Thus, in the heated zone the acoustic relative index of refraction (ratio of velocity in unheated zone to velocity in heated zone) changes. Thus, the wave train is deflected (reflected, diffracted or refracted) as a result of this velocity variation. If the heating occurs in the path to or from a reflection at a flaw or at the flaw itself, the intensity of acoustic radiation received from flaw reflection diminishes. But unavoidable heating of areas adjacent the ray path reflects some energy traveling alongside the ray path toward the flaw to thereby diminish the losses experienced from heating the ray path. This same conclusion can be reached by regarding the hot spot on the ray path as an anomaly around which radiation diffracts. In effect it has diffuse but defined edges which because of the long acoustic wave length serves also to bend and redirect the wave train on both sides of the anomaly.

(ii) If the heating center occurs near but not in the path to or from a flaw or at the flaw, acoustic radiation which heretofore was not deflected such as to result in a flaw signal may be now diverted into a path which will intersect the flaw resulting in a flaw signal such that the intensity of the received signal actually increases over that received when no heat is applied.

Although I believe the above to be the theory which causes the bubbling or amplitude variations, or the shifting of the pattern of pulses on the oscilloscope 13, I do not wish to be limited to this theory. The primary phenomenon I have observed is that it is possible to alter or change the amplitude, phase and spacing relationship of the transmitted wave trains within a wide bandwidth, as for example, 1.0–3.0 mc., to a marked extent by merely changing the temperature of certain localized areas in the plate in the path of the sound waves.

Although I have described this effect as being obtained by having a transmitting transducer located at one end and a receiving transducer located at the other end of a member, this effect can also be obtained by using a single transducer with pulse echo techniques.

This same effect, i.e., perturbation of the sound waves, can be obtained to a lesser degree by reducing the temperature in a localized area such as by the application of liquid nitrogen ($LN_2$). However, the rate of change of temperature is much less rapid than that obtained by heating with an oxyacetylene torch and much less localized. For example, by utilizing oxyacetylene heating the temperature can be relatively quickly increased from room temperature to approximately 1500° F. and above to give a 1400° F. temperature change (although a much lesser temperature rise is required for the effect), whereas the application of $LN_2$ or a similar cryogenic material only lowers the insonated member temperature from room temperature down to the tempreature of liquid nitrogen or cryogenic material used and gives a temperature change of only approximately 200° F. As well, when $LN_2$ contacts the plate or waveguide 11, a wetting action results which causes some absorption of the sound wave trains in the area wetted by $LN_2$ in a manner hereinafter described. The over-all effect is that the bubbling effect is less apparent with application of cryogenic liquid baths although a general change in signal pattern and amplitude on oscilloscope 13 does occur. Overall, it should be readily apparent that it is possible to obtain a greater effect with the application of heat by a torch or other high temperature heat source because of the greater temperature range to which the insonated object is subjected.

Utilization of this effect in a method to determine the location of flaws is shown in FIGURE 2. The member being tested is a pipe 26 on which offsets or wave directors 27 and 28 have been mounted on opposite ends.

These offsets 27 and 28 are of the type described in co-pending application Serial No. 151,331, filed November 9, 1961, now U.S. Patent 3,186,216. A transmit transducer T is mounted on the offset or wave director 27 and receive transducer R is mounted on the offset or wave director 28. The transmit and receive transducers are connected to a transmitting, receiving and display apparatus of the type shown in FIGURE 1.

Operation of the transmitting, receiving and display apparatus causes the transducer T to generate ultrasonic wave trains which are introduced into the offset 27. These wave trains are introduced into the end of the pipe wall at point A. However, the area of contact between the offset 27 and the end of the pipe is sufficiently wide so that a substantially uncollimated angularly diverging group of ultrasonic wave trains indicated by the rays 29 are introduced into the pipe to insonate (fill with sound) the pipe. These wave trains propagate in a direction which is away from the transmit offset and follow a helical path longitudinally around the pipe toward the other end of the pipe as shown in the drawing. The ultrasonic wave train follows these helical paths because from the point of view of the short wavelength helical ultrasonic wave train, the pipe represents a flat plane of finite thickness and length but which is infinitely wide.

Now let it be assumed that there is a flaw at C and that the line C'-C" represents a longitudinal seam in a tubular member such as a pipe. Sonic waves introduced into the pipe will impinge upon this flaw and will be deflected therefrom in another angularly diverging group of wave trains in an oblique angle. The deflected wave trains also travel in helices but opposite in direction to the direction followed by the wave trains introduced into the pipe. The deflected wave trains will emerge at point B and will be received by the receive offset 28 and by the transducer R to cause signals to be displayed on the oscilloscope 13 of the display apparatus. These signals indicate the presence of a flaw. However, they do not indicate the location of the flaw.

Now let it be assumed that suitable means for applying heat in localized areas such as the oxyacetylene torch hereinbefore described is utilized, and that the weld from C' to C" is progressively heated in successive localized areas by moving the torch along the pipe manually or by automatic means. Until point C the point of the flaw or the point where the helical wave train ray AC, which is insonating the flaw is reached, there will be little bubbling effect upon the display on the oscilloscope because there is no direct sonic connection between the transmit transducer T and the receive transducer R and the heated area. However, as soon as point C is reached, a pronounced bubbling or fluctuation of the pattern on the oscilloscope presentation will occur which will immediately indicate that the torch is positioned at the point of the flaw to thus give the exact position of the flaw. This interaction results because on FIGURE 2, point C lies on a direct, bounced wave path connecting transmit transducer T, the flaw at C and the receive transducer R. These perturbations can be observed visually or automatic means can be utilized for making such observations. For example, a comparator such as that disclosed in FIGURE 1 can be connected to the output from the receive transducer R to stop the automatic movement of the torch when the perturbations, e.g., voltage variations, in the signal received are noted by the comparator to indicate that the exact location of the flaw has been reached by the heating means.

From the foregoing, it can be seen that such a technique can be utilized to map the paths of various rays of sound within a member by traversing the heat source across the member and observing where a particular ray which is being received by the receive transducer is affected and noting the location of the means for applying the heat at that time.

As shown in FIGURE 3, the same principle can be utilized for determining the location of flaws in girth welds indicated by the line D'-D" wherein the flaw D is perpendicular to the longitudinal axis of the pipe 26. As the heat source is traversed along the girth weld D'-D", no perturbations will be observed on the display apparatus until the point D, the location of the flaw, is reached.

In FIGURES 2 and 3, I disclose the use of the method for locating flaws in tubular objects. In FIGURE 4, the method for determining the location of flaws in flat plates is disclosed. As indicated, the offsets or wave directors 27 and 28 are mounted on opposite ends of the plate 11 and are provided with transmit and receive transducers as indicated. These transducers are connected to transmitting, receiving and display apparatus of the type shown in FIGURE 1. The ultrasonic wave trains which are introduced into the plate are at an angle to the longitudinal axis of the plate and follow the straight lines indicated. From the viewpoint of the ultrasonic wave, the plate 11 has a finite length, thickness and width. On the other hand, the tubular members, as shown in FIGURES 2 and 3, from the viewpoint of ultrasonic waves, have a finite length and thickness but have an infinite width. This characteristic of infinite width arises from the fact that an ultrasonic wave train in a tubular member will travel in a helical path which it will follow until it intercepts the end of the pipe.

This infinite width which can be found in tubular members can be simulated in the plate 11 by uniformly heating the edge DE of the plate to greatly attenuate all ultrasonic waves which strike the edge and, therefore, in effect, create an infinite edge so that there is no reflection of ultrasonic waves from the edge DE. Thus, when this is done, all of the signals which are received by the receive transducer must be deflected from flaws within the plate. As soon as this has been accomplished, the same location techniques as hereinbefore described with the tubular members can be utilized, that is, spot heating can be utilized until an area is heated which causes pronounced bubbling or fluctuation in the pattern appearing on the cathode ray tube. The only location at which this significantly occurs is at the flaw C and hence as soon as the bubbling is observed, the position of the flaw has been located.

If desired, the edge DE can be heated progressively rather than all at once. In doing this, it is necessary to observe the oscilloscope to determine whether any perturbations occur in the presentation. If perturbations occur while progressively heating the edge DE, this indicates that the signals being received are spurious signals and do not indicate a flaw in the plate. The signals which represent true flaws will not be perturbed by merely heating the edge of the plate. After all signals which are perturbed by heating of the edge have been determined, the locations of the flaws creating the other signals can be determined by spot heating of the plate as hereinbefore described.

In order to check the plate completely, it may be desirable to shift the offsets 27 and 28 to the other two sides and to heat one of the side edges of the plate. After this has been completed, the offsets can be shifted again and another edge of the plate heated, always maintaining the same relative arrangement shown in FIGURE 4.

By placing a plurality of transmit offsets 27 and receive offsets 28 on the same sides as those already positioned in FIGURE 4 together with the associated transmit and receive transducers, all flaws which are generally parallel to edge DE can be readily located. Flaws which lie in a direction, generally at right angles to the edge DE, can be found by shifting the transmit and receive offsets to the other sides of the plate such as sides DE and GH and then heating side DG. Again, this process can be carried around all sides of the plate, maintaining the same relative arrangement of offsets and heated edge as shown in FIGURE 4 to locate all flaws with some element in the thickness dimension.

In FIGURE 5, I have shown another embodiment of the method and apparatus in which the wall of a tubular member 26 is insonated in a manner hereinbefore described in FIGURES 2 and 3. However, instead of creating a temperature change in a localized area in order to determine the location of the flaw, I provide other means for attenuating the sound waves in the localized area in the wall of the pipe which consists of jetting a small stream 41 of a suitable liquid such as water onto the wall of the pipe. The liquid is normally a relatively good medium for transmitting sound waves and because a localized area of the pipe is wetted by the liquid, sonic energy will be conducted away from this localized area into the stream. This will, in turn, cause a reduction in the amplitude of the pulse produced by the receive transducer R and, in turn, will reduce the amplitude of the pulse appearing on the oscilloscope. As hereinbefore pointed out, the jet of water will not have any effect on the signal on the pulse appearing on the oscilloscope unless it is located at the point of the flaw indicated at C or on said ray path between the transmitter or receiver to attenuate the sonic wave train and to thereby attenuate the signal which is produced by the receive transducer R. When there is no direct sonic connection between the transmit and receive transducers, the application of the jet of water to localized areas other than the area of the flaw will not have any effect upon the pulse appearing on the oscilloscope.

In order to minimize undue wetting of the surface of the wall and to wet only a localized area, I have found it desirable to mount the nozzle 42 which is utilized for providing the thin stream of liquid 41 within a cylindrical cup 43 which may be shifted on the wall of the pipe 26. This cup is connected to a suitable suction or vacuum through the hole 46. This suction serves to withdraw the excess water and ensures that only a localized area is wetted by the stream 41.

Although I have described the use of water, it is readily apparent that other liquids can be utilized such as oil, if desired, for obtaining the same effects.

It is apparent that although the method has been described as applying to the testing of tubular or flat objects to determine flaw location, the same techniques can be applied to monitor an insulated tubular object for local or general temperature changes. By suitable permanent installation of the offsets to the object and continued insonation of the object, it is possible to observe if any insulation failure or otherwise caused local heating occurs in an object such as a rocket casing so that the system herein described becomes a temperature monitoring system. By the same token, this technique can be used to monitor a system where a tubular object carrying a corrosive fluid is lined with an inert substance and it may be desirable to observe if any failure of this inert liner has occurred. If the object is insonated, as previously described, the failure of the liner can be observed as a signal attenuation by the wetting and resultant sound absorption within the wetting fluid.

It is apparent from the foregoing that I have provided a new and improved method and apparatus for the detection and location of flaws. The apparatus required is relatively simple and eliminates the use of expensive and complicated electronic circuitry. The apparatus is such that it can be readily used for field testing if desired.

I claim:

1. In the method for the non-destructive testing of a member to determine the existence and location of flaws in the member, introducing angularly spread ultrasonic wave trains into the member, certain of the wave trains interacting with the flaw to provide deflected ultrasonic wave trains, receiving certain of the deflected wave trains, changing the ultrasonic characteristics of the material of which the member is formed in successive small localized areas until an area is found which when the ultrasonic characteristics are changed causes perturbations in the received wave trains, detecting flaw indicative perturbations in the received wave trains which occur when the small localized area contains a flaw, and determining the position of the small localized area in which the ultrasonic characteristics have been changed when a perturbation indicative of a flaw has been detected.

2. A method as in claim 1 wherein the ultrasonic characteristics are changed by causing a localized temperature change at the flaw.

3. A method as in claim 1 wherein the ultrasonic characteristics are changed by carrying away portions of the energy comprising the wave trains at the flaw.

4. A method as in claim 1 wherein the ultrasonic characteristics are changed by application of a liquid to the member in the localized area of the flaw.

5. A method as in claim 1 wherein the ultrasonic characteristics are changed by heating the member in the localized area of the flaw.

6. In a method for the nondestructive testing of a member, introducing angularly spread wave trains into the member, receiving ultrasonic wave trains from the member, scanning the area of the member with means to create changes in the stress pattern and characteristics of the material of which the member is formed in relatively small localized areas and detecting the changes created in the received wave trains caused by the change in the stress patterns and characteristics in the localized area.

7. In apparatus for the non-destructive testing of a member to determine the existence and locations of flaws in the member, a transmit transducer mounted on the member, a receive transducer mounted on the member, the transmit transducer being oriented so that it introduces ultrasonic wave trains into the member at an angle which differs from a line passing through the transmit and receive transducers, certain of the wave trains interacting with a flaw on the member to provide deflected ultrasonic wave trains which are received by the receive transducer, means connected to said receive transducer for displaying the pattern of the ultrasonic wave trains received from the flaw, and means for changing the ultrasonic characteristics of the material of which the member is made, said last named means and said member being movable relative to each other so that a series of successive small localized areas of the member may be scanned until a flaw indicative perturbation is received as identified by a pronounced effect in the pattern displayed in said display means.

8. Apparatus as in claim 7 wherein the means for changing the ultrasonic characteristics consists of means for applying heat to the member in the small localized areas.

9. Apparatus as in claim 7 wherein the means for changing the ultrasonic characteristics includes means for causing a temperature change in the localized areas.

10. Apparatus as in claim 7 wherein the means for changing the ultrasonic characteristics includes means for carrying away portions of the energy comprising the wave trains in the localized areas.

11. Apparatus as in claim 7 wherein the means for changing the ultrasonic characteristics includes means for applying a liquid to the localized areas.

12. Apparatus as in claim 11 wherein the means for applying liquid includes means for causing a stream of liquid to impinge upon the member in the localized areas and means for removing the liquid after it has impinged upon the member.

13. Apparatus as in claim 10 wherein means for carrying away portions of the energy consists of an open-ended cup-like member having its open end engaging the member and facing the member in the localized area of the flaw, a nozzle mounted in the cup-like member for inducing a stream of liquid into the member and to impinge upon the member in the localized area of the flaw, and means attached to the cup-like member for withdrawing the excess liquid from the cup-like member so that only the localized area of the member is wetted by the liquid.

14. Apparatus for the non-destructive testing of a member as in claim 7 further including automatic means for moving the means for changing the ultrasonic characteristics about the member to thereby scan the member until a flaw indicative perturbation is received.

15. In apparatus for the non-destructive testing of a relatively planar member to determine the existence and location of flaws in the member, transmit and receive transducers mounted on the member, means for applying energy to the transmit transducers so that ultrasonic wave trains are introduced into the member, the orientation of the transmit transducers being such that the rays enter the member at an angle which differs from a line passing through the transmit and receive transducers, certain of the wave trains being deflected by a flaw in the member to provide ultrasonic wave trains which are received by the receive transducer, means for attenuating sound waves on an edge of the member which is substantially parallel to the line passing through the transmit and receive transducers, means connected to said receive transducer for displaying the pattern of the ultrasonic wave trains received from the flaw and means for changing the ultrasonic characteristics of the material of which the object is made, said last named means and said member being movable relative to each other so that a series of successive small localized areas of the member may be scanned until a flaw indicative perturbation is received as identified by a pronounced effect in the pattern displayed in said display means.

References Cited by the Examiner

UNITED STATES PATENTS

| | | | |
|---|---|---|---|
| 2,527,986 | 10/1950 | Carlin | 73—67.8 |
| 2,937,522 | 5/1960 | McGaughey | 73—67.7 |

FOREIGN PATENTS

| | | |
|---|---|---|
| 765,906 | 1/1957 | Great Britain. |

LOUIS J. CAPOZI, *Primary Examiner.*

RICHARD C. QUEISSER, *Examiner.*

HARRY J. ROPER, JOSEPH W. HARTARY,
*Assistant Examiners.*